L. F. FOUTS.
Electric Alarm.

No. 234,765.            Patented Nov. 23, 1880.

WITNESSES:
W. W. Hollingsworth
Edw. W. Byrn

INVENTOR:
L. F. Fouts
BY
ATTORNEYS.

UNITED STATES PATENT OFFICE.

LAMBERT F. FOUTS, OF GREENFIELD, IOWA.

ELECTRIC ALARM.

SPECIFICATION forming part of Letters Patent No. 234,765, dated November 23, 1880.

Application filed January 30, 1880.

*To all whom it may concern:*

Be it known that I, LAMBERT FREDERIC FOUTS, of Greenfield, in the county of Adair and State of Iowa, have invented a new and Improved Electric Alarm; and I do hereby declare that the following is a full, clear, and exact description of the same, reference being had to the accompanying drawings, forming part of this specification, in which—

Figure 1:
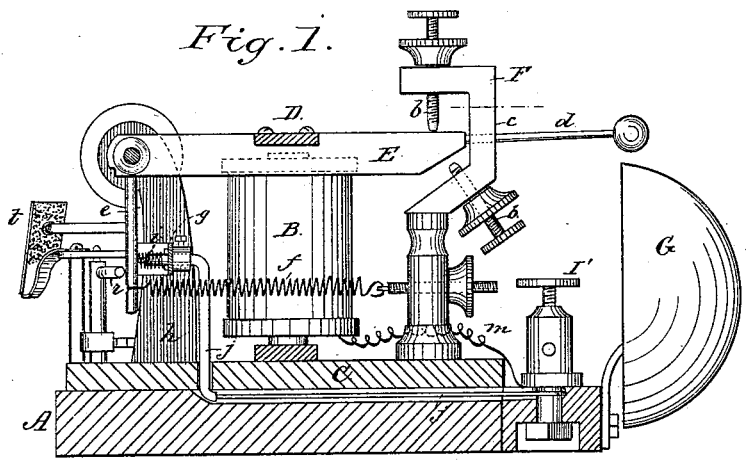
Figure 2:
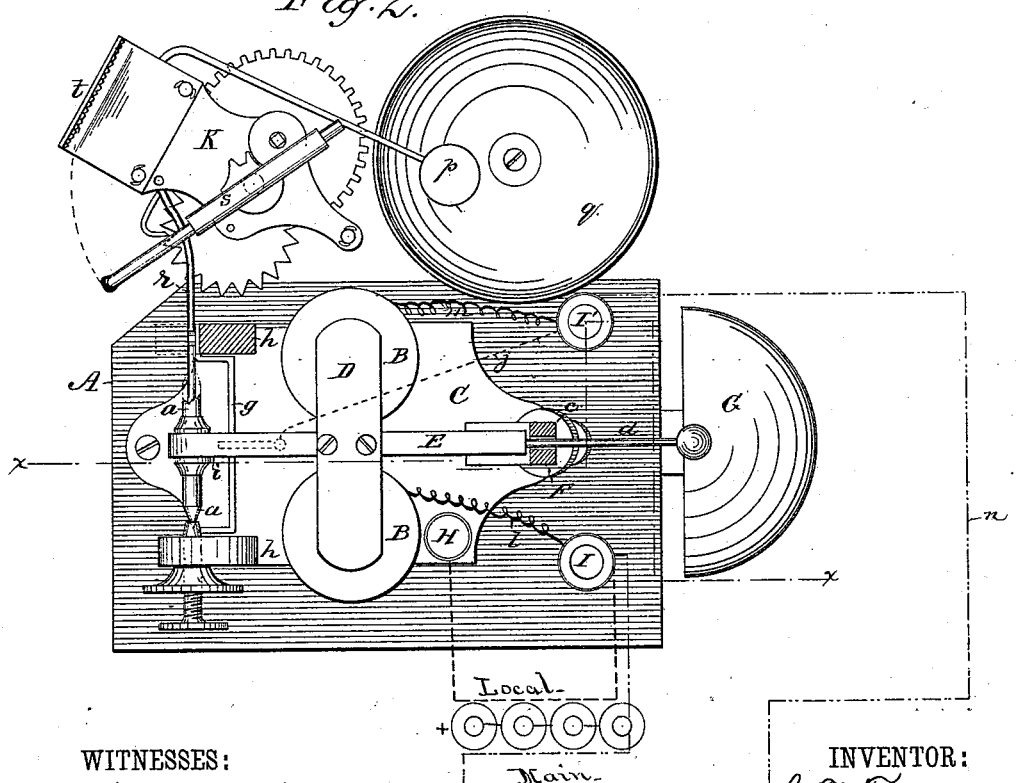

Figure 1 is a vertical section through the line *x x* of Fig. 2. Fig. 2 is a plan view.

My invention relates to an improved electric alarm, which is designed to be set off to give a continuous warning by the breaking of an electric circuit, and which may be employed for various uses, as hereinafter described.

It consists in the peculiar construction of a circuit-breaking mechanism, as hereinafter fully described, and pointed out in the claim.

In the drawings, A represents a base upon which the instrument is supported. B are the electro-magnets, arranged in vertical position upon a suitable metal frame, C. Upon the upper face of these magnets is arranged an armature, D, fixed to a horizontal armature-lever, E, which rocks upon pivots *a a*, and is limited in its range of movement by the stop-screws *b b* in the standard F. This standard is slotted at *c*, near its upper end, and through this slot there extends an arm, *d*, attached to the armature-lever, which bears a hammer at its outer end, which hammer is designed to ring an alarm on the bell G.

Projecting downward from the armature-lever at its pivoted end is an arm, *e*, to which is attached a spiral spring, *f*, that tends always to hold the armature away from the magnets.

On a cross-bar, *g*, connecting the two pivot-supports *h h*, is arranged a contact-spring, *i*, which has electrical connection with an insulated wire, *j*, running beneath the base A. These parts are so relatively arranged that when the armature is resting tightly against the magnets the arm *e* is removed from the contact-spring; but when the armature is away from the magnets said arm is resting against said contact-spring, and is adapted to close an electric circuit therethrough, as hereinafter described.

H and I I' are three binding-posts, which are connected as follows: H, to the metal parts of the frame and the armature-lever with its arm *e*; I, to one of the poles of the magnets by wire *l*; and I' is connected to the other pole of the magnets by wire *m*, and also to the contact-spring *i* by an insulated wire, *j*, running under the base of the instrument. These several binding-posts are connected to the battery, and through them the instrument is made to act as follows: Post H is connected to the positive pole of the battery, and post I is connected to the negative pole, while post I' is connected to the positive pole, the circuit-wire *n* being made to traverse the points which it is required to protect and forming the primary circuit. Now, when the wire *n* is adjusted to the window, door, drawer, or other point, so long as it is unbroken, the current traverses the same as follows: passing through the battery to the post I, thence through the magnets to post I', and through the circuit-wire back again to the battery. So long as this condition is maintained it will be seen that the magnets are charged, and the armature being held down tight, the arm *e* of the armature-lever is held out of contact with the contact-spring. As soon, however, as the primary circuit is broken by a burglar, a fire, or other cause, the armature flies back, by reason of its spring, and the arm *e* presses against the contact-spring *i*. The current then passes from the battery to post I, thence to the magnets, thence to the post I', thence through the insulated wire beneath to the contact-spring *i*, thence to the arm *e*, thence through the metal frame to post H, and thence to the battery again. The result is, that the magnets are again immediately charged by the short circuit or secondary current; but as the movement of the armature in approaching the magnet again breaks this short circuit by withdrawing the arm *e* from the contact-spring *i*, it will be seen that the armature-lever is rapidly vibrated by the alternate making and breaking of said circuit, and the result is, that a continuous alarm is rung upon the bell by the hammer borne by the arm on the end of the armature-lever.

In connection with the apparatus as thus described I may employ a supplemental alarm, as shown at K, which consists of a clock-alarm mechanism, whose hammer *p* is arranged to operate upon a bell, q, and whose mechanism is tripped or set off by the action of arm e of the electrical alarm upon the arm r of the clock-escapement. A match-holding tube, s, is also arranged on one of the shafts of the wheels at right angles to said shaft, and is made to strike a match against a surface, t, of sand-paper to afford a light.

In making use of this device I employ the same as a burglar-alarm, fire-alarm, low-water indicator, or for any other analogous purpose.

I am aware that the several features hereinbefore described and shown are not broadly new, and I therefore only claim the peculiar construction and arrangement of the circuit-breaking device, in connection with the circuit-lines, as described.

Having thus described my invention, what I claim as new is—

The combination of the magnets B, the armature-lever E, having downwardly-projecting arm e and spring f, supporting-standards h h, the cross-bar g, fixed between and attached to the supporting-standards, and carrying the spring-contact i, and the circuit-wires, arranged substantially as described.

LAMBERT FREDERIC FOUTS.

Witnesses:
W. W. BURRELL,
R. WALLACE.